US010409260B2

(12) United States Patent
Kawatake

(10) Patent No.: US 10,409,260 B2
(45) Date of Patent: Sep. 10, 2019

(54) ABNORMALITY DETECTION SYSTEM, SEMICONDUCTOR DEVICE MANUFACTURING SYSTEM AND SEMICONDUCTOR DEVICE MANUFACTURING METHOD

(71) Applicant: RENESAS ELECTRONICS CORPORATION, Tokyo (JP)

(72) Inventor: Masatoshi Kawatake, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 45 days.

(21) Appl. No.: 15/895,419

(22) Filed: Feb. 13, 2018

(65) Prior Publication Data
US 2018/0292806 A1 Oct. 11, 2018

(30) Foreign Application Priority Data
Apr. 6, 2017 (JP) .................................. 2017-075650

(51) Int. Cl.
*G05B 19/406* (2006.01)
*G05B 19/418* (2006.01)

(52) U.S. Cl.
CPC ....... *G05B 19/406* (2013.01); *G05B 19/4184* (2013.01); *G05B 19/41875* (2013.01); *G05B 2219/32204* (2013.01); *G05B 2219/45031* (2013.01)

(58) Field of Classification Search
CPC ........ G05B 19/406; G05B 2219/32204; G05B 2219/45031; G05B 19/41875; G05B 19/4184
See application file for complete search history.

(56) References Cited

U.S. PATENT DOCUMENTS

| 7,702,413 | B2 * | 4/2010 | Ushiku | .............. G05B 19/4184 |
| | | | | 438/770 |
| 8,000,922 | B2 * | 8/2011 | Chen | .................. G01N 21/9501 |
| | | | | 356/237.4 |
| 9,791,855 | B2 * | 10/2017 | Han | ................. G05B 19/41875 |
| 2006/0142967 | A1 * | 6/2006 | Hoeks | ................ G03F 7/70291 |
| | | | | 702/117 |

(Continued)

FOREIGN PATENT DOCUMENTS

JP 2006-278547 A 10/2006

*Primary Examiner* — Chun Cao
(74) *Attorney, Agent, or Firm* — McDermott Will & Emery LLP

(57) ABSTRACT

To provide an abnormality detection system capable of reducing work load of an engineer. An algorithm storage unit stores therein a detection algorithm corresponding to identification information of a detection target. An abnormality detection unit detects an abnormality in a detection target signal obtained from a monitor signal of the detection target using a corresponding detection algorithm in the algorithm storage unit. A detection target identification unit determines whether the detection algorithm corresponding to the identification information of the detection target is stored in the algorithm storage unit, and issues a generation request when it is not stored therein. An algorithm generation unit generates the detection algorithm using a corresponding detection target signal according to the generation request.

18 Claims, 12 Drawing Sheets

(56) References Cited

U.S. PATENT DOCUMENTS

2008/0004823 A1\* 1/2008 Matsushita ...... G05B 19/41875
  702/82
2009/0299681 A1\* 12/2009 Chen ................. G01N 21/9501
  702/123

\* cited by examiner

| PACKET TYPE | SIZE | PAYLOAD |

TYP, SZ, PLD

| PACKET TYPE | PACKET CONTENT |
| --- | --- |
| 1 | DETECTION TARGET SIGNAL (TS) |
| 2 | DETECTION RESULT (OUT) |
| 3 | IDENTIFICATION INFORMATION (DI) |
| 4 | GENERATION REQUEST (GR) |
| 5 | DETECTION PARAMETER (AL) |

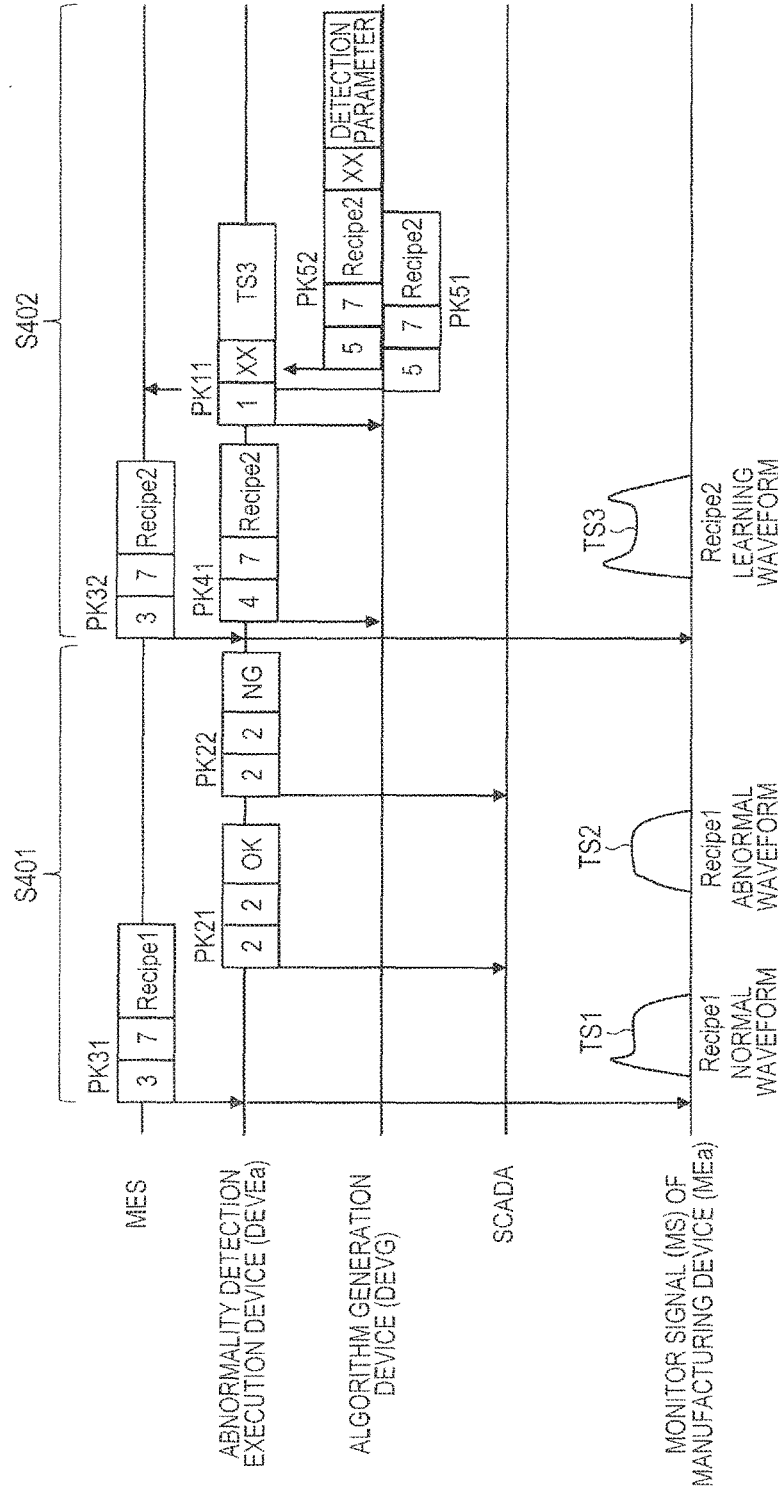

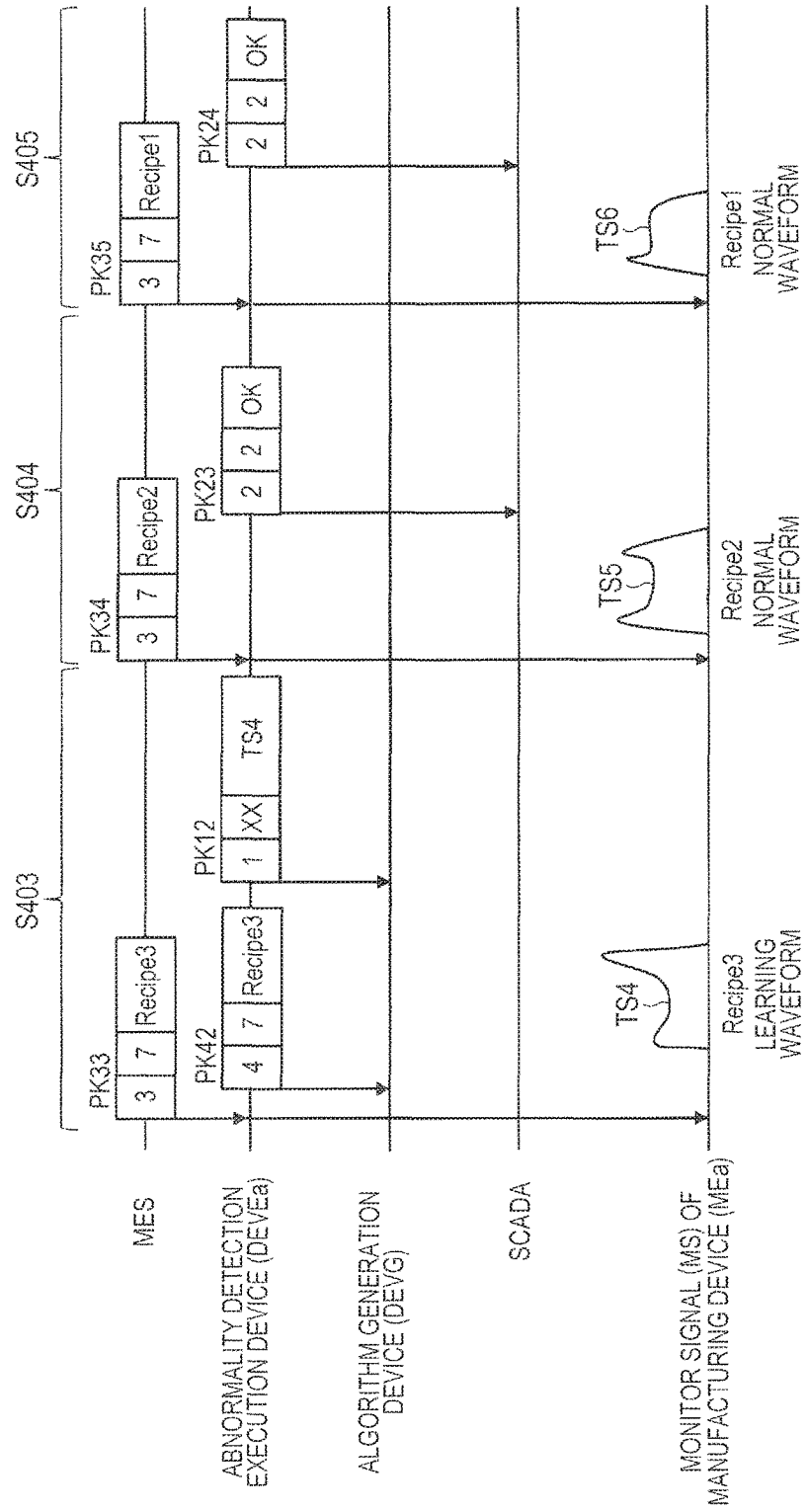

ABNORMALITY DETECTION SYSTEM, SEMICONDUCTOR DEVICE MANUFACTURING SYSTEM AND SEMICONDUCTOR DEVICE MANUFACTURING METHOD

CROSS-REFERENCE TO RELATED APPLICATIONS

The disclosure of Japanese Patent Application No. 2017-075650 filed on Apr. 6, 2017 including the specification, drawings and abstract is incorporated herein by reference in its entirety.

BACKGROUND

The present invention relates to an abnormality detection system, a semiconductor device manufacturing system, and a semiconductor device manufacturing method, and specifically to a technology of detecting an abnormality of a manufacturing device or the like.

For example, Japanese Unexamined Patent Application Publication No. 2006-278547 discloses an abnormality detection system capable of avoiding an erroneous detection of an abnormality in a processing device. In the abnormality detection system, an abnormality detection server detects an abnormality of the processing device using either a basic algorithm having a plurality of parameters or a temporary algorithm excluding a parameter that temporarily varies according to maintenance work.

SUMMARY

In recent years, with the fourth industrial revolution, such technologies as AI (Artificial Intelligence) and IoT (Internet of Things) have been increasingly applied to the manufacturing system in order to improve manufacturing efficiency. Using such a manufacturing system makes it possible to, for example, monitor a processing state of the manufacturing device in real time using various sensors and detect an abnormality of the manufacturing device promptly based on the monitoring result.

For detecting the abnormality, for example, as disclosed in Japanese Unexamined Patent Application Publication No. 2006-278547, it is feasible to register a plurality of detection algorithms in a storage device in advance, select any one of the detection algorithms, and detect the abnormality of a detection target based on the selected detection algorithm. With such a scheme, however, in a case where a new detection algorithm is required for a new detection target, an engineer generally needs to determine the detection algorithm while repeating prototyping of a product using the manufacturing device isolated from a mass production line and register the detection algorithm in the storage device.

Embodiments described below have been made in light of the above problems, and other problems and new features will become apparent from the following description and accompanying drawings.

An abnormality detection system according to one embodiment includes an algorithm storage unit, an abnormality detection unit, a detection target identification unit, and an algorithm generation unit. The algorithm storage unit stores therein detection algorithms corresponding to identification information of a detection target. The abnormality detection unit detects an abnormality in a detection target signal obtained from a monitor signal of the detection target using a corresponding detection algorithm in the algorithm storage unit. The detection target identification unit determines whether the detection algorithm corresponding to the identification information of the detection target is stored in the algorithm storage unit and issues a generation request when it is not stored therein. The algorithm generation unit generates a detection algorithm using a corresponding target signal according to the generation request.

The one embodiment makes it possible to reduce workload of the engineer.

BRIEF DESCRIPTION OF THE DRAWINGS

FIG. 11A is a timing chart schematically showing an example of a semiconductor device manufacturing method using the manufacturing system shown in FIG. 10;

FIG. 11B is a timing chart that follows FIG. 11A; and

DETAILED DESCRIPTION

Although the present invention will be described below in separate sections or embodiments as needed, they are not irrelevant to one another, but one may be a variation, detail, or supplementary explanation of a part or all of the other unless otherwise expressly stated. When referring to a number (including a number of pieces, a numerical value, an amount, and a range) in the following embodiments, it is not limited to the specific number but may be more than or less than the specific number unless otherwise expressly stated or unless apparently limited to the specific number in principle.

Furthermore, it is needless to say that components (including element steps) in the following embodiments may not necessarily be essential unless otherwise expressly stated or unless apparently necessary in principle. Similarly, in the following embodiments, when referring to a shape, a positional relation or the like of the components, what is approximate to or similar to the shape is substantially included unless otherwise expressly stated or unless apparently not applicable in principle. This similarly applies to the numeral values and ranges described above.

Hereinbelow, embodiments of the present invention will be described with reference to drawings. It should be noted that like components are denoted by like numerals throughout the drawings and the explanation thereof may not be repeated.

First Embodiment

[Configuration of Abnormality Detection System]

Figure 1:
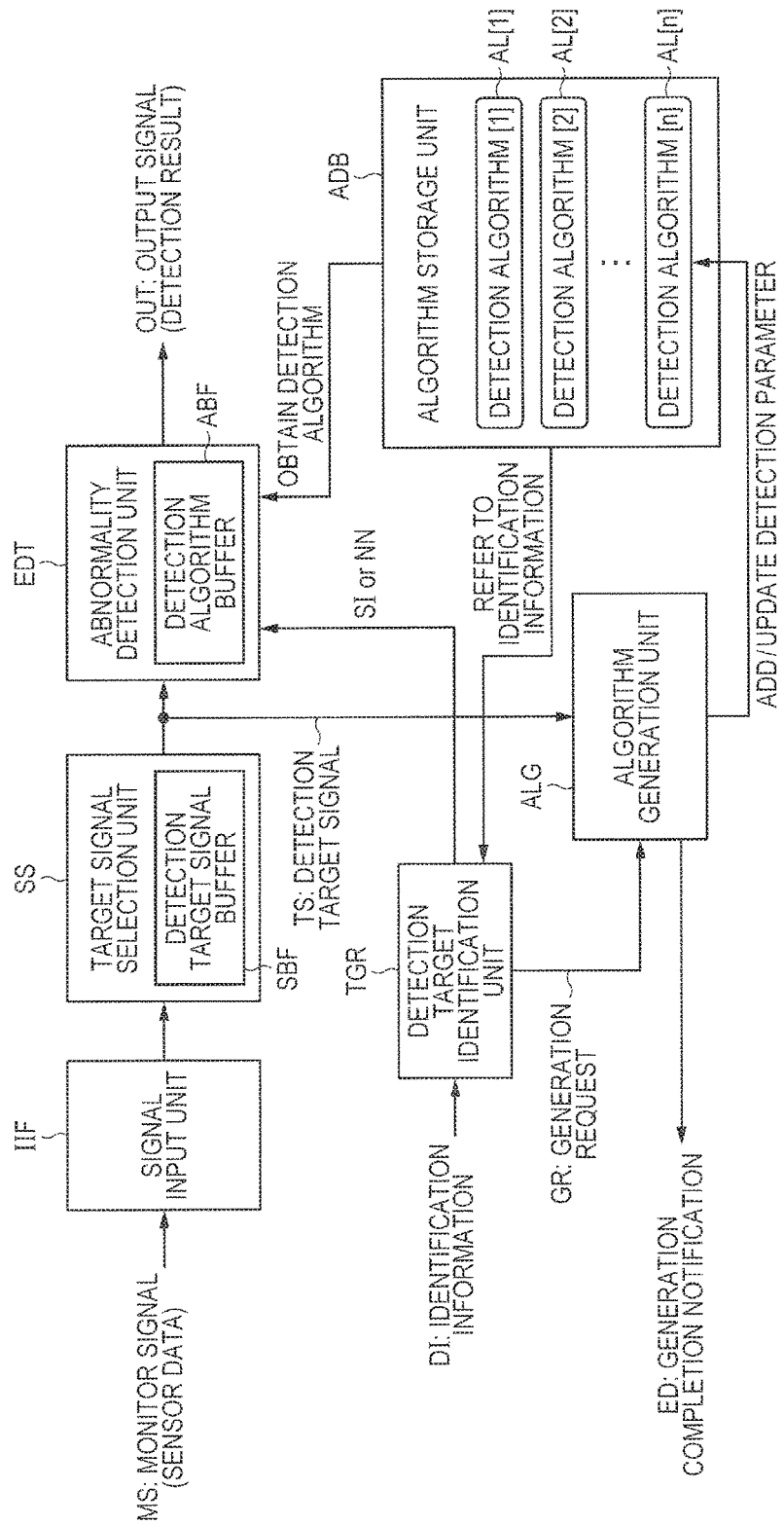
FIG. 1 is a schematic diagram showing an exemplary configuration of a main part of an abnormality detection system according to a first embodiment of the present invention.

FIG. 1 is a schematic diagram showing an exemplary configuration of a main part of an abnormality detection system according to a first embodiment of the present invention. The abnormality detection system (abnormality detection device) shown in FIG. 1 includes a signal input unit IIF, a target signal selection unit SS, an abnormality detection unit EDT, a detection target identification unit TGR, an algorithm generation unit ALG, and an algorithm storage unit ADB. A case of detecting an abnormality of a manufacturing device in a semiconductor device manufacturing system is assumed herein as an example of the abnormality detection system. It should be noted, however, that the invention is not limited to such a case, but the abnormality detection system is applicable as a system that detects an abnormality of various production devices in various production systems.

The signal input unit IIF receives a monitor signal MS from a detection target, performs a predetermined signal processing, and transmits the resulting signal to the target signal selection unit SS. The monitor signal MS is indicative of, for example, a processing state of the manufacturing device, which is a sensor signal from various sensors provided in the manufacturing device or added to the manufacturing device. The various sensors may be any sensors such as, for example, a flow sensor that monitors a flow rate of a gas, a pressure sensor that monitors a pressure in a chamber, a power sensor that monitors an RF power of plasma, and an EPD (End Point Detector) that monitors a progress of etching.

In the semiconductor device manufacturing system, the sensor signal can be communicated between devices using a communication protocol called SECS (SEMI Equipment Communications Standard). As a physical interface of the SECS, RS232 or Ethernet (registered trademark) may be used. The signal input unit IIF takes a role of, for example, a communication interface of the SECS. In such a case, the signal input unit IIF receives a sensor signal transmitted from a sensor using the SECS, for example. The signal input unit IIF may also include, for example, an analog-digital conversion circuit. In this case, the signal input unit IIF directly receives an analog signal from the sensor as the monitor signal MS without using the SECS, converts the analog signal to a digital signal, and transmits the digital signal to the target signal selection unit SS.

The target signal selection unit SS determines a detection target signal TS as a detection target from among the monitor signals MS received via the signal input unit IIF, and stores the detection target signal TS in a detection target signal buffer SBF. The target signal selection unit SS transmits the detection target signal TS stored in the detection target signal buffer SBF to the abnormality detection unit EDT and the algorithm generation unit ALG. For example, in a case where the sensor is constantly in operation, the monitor signal MS may include a signal of an unnecessary section (for example, an idle section in which the manufacturing device is not performing any practical operation). The target signal selection unit SS determines a detection target section in which the manufacturing device is substantially in operation from among the monitor signals MS, and extracts a signal of the section as the detection target signal TS. Specifically, for example, when the monitoring signal MS presents OV in the idle section, the target signal selection unit SS specifies the detection target section as a section in which the voltage level of the monitor signal MS is 0.1 V or higher.

The algorithm storage unit ADB stores therein a plurality of detection algorithms AL [1] to AL [n] corresponding to identification information DI of the detection target. Herein, the plurality of detection algorithms AL [1] to AL [n] are collectively referred to as a detection algorithm AL. The abnormality detection unit EDT detects an abnormality of the detection target signal TS using the detection algorithm AL corresponding to the identification information DI stored in the algorithm storage unit ADB, and transmits an output signal OUT as a detection result. When the abnormality is detected, an alarm display on a monitor or the like, an abnormality notification to another control equipment, a lighting to notify detection of the abnormality, or the like may be activated based on the output signal OUT.

The detection algorithm AL may include an algorithm based on the AI, an algorithm based on a statistical approach, and the like. The AI based algorithm may use, for example, a model of a neural network that has learned a feature of the detection target signal TS. The model allows for generating, for example, an expected value signal (i.e., ideal detection target signal) by receiving the detection target signal TS and reflecting the learned feature on the received signal. The abnormality detection unit EDT determines the presence of the abnormality in the detection target signal TS based on whether a difference between the detection target signal TS and the expected value signal is within an acceptable range. On the other hand, the algorithm based on the statistical approach uses a normal distribution model reflecting various statistical values of the detection target signal TS, a multivariate analysis model, or the like. The abnormality detection unit EDT determines the presence of the abnormality of the abnormality in the detection target signal TS based on whether a variation or the like of the detection target signal TS is within a range statistically (logically) regarded to be normal using these models.

The detection target identification unit TGR receives the identification information DI of the detection target, and determines whether the detection algorithm AL corresponding to the identification information DI is stored in the algorithm storage unit ADB. The detection target identification unit TGR transmits selection information SI to the abnormality detection unit EDT when the detection algorithm AL is stored in the algorithm storage unit ADB. The selection information SI is used to identify the detection algorithm AL corresponding to the identification information DI. The abnormality detection unit EDT obtains the detection algorithm AL corresponding to the identification information DI from the algorithm storage unit ADB based on the selection information SI and stores the detection algorithm AL in a detection algorithm buffer ABF, thereby performing an abnormality detection based on the detection algorithm AL.

On the other hand, when the detection algorithm AL corresponding to the identification information DI is not stored in the algorithm storage unit ADB, the detection target identification unit TGR transmits an unsupported notification NN to the abnormality detection unit EDT and issues a generation request GR to the algorithm generation unit ALG. The algorithm generation unit ALG includes, for example, the identification information DI. When receiving the unsupported notification NN, the abnormality detection unit EDT does not detect an abnormality in the detection target signal TS.

The algorithm generation unit ALG generates the detection algorithm AL corresponding to the identification information DI included in the generation request GR using the detection target signal TS from the target signal selection unit SS. When generation of the detection algorithm AL is completed, the algorithm generation unit ALG issues a generation completion notification ED and stores the generated detection algorithm AL in the algorithm storage unit ADB. For example, an engineer recognizes that the abnormality detection based on the detection algorithm AL by the abnormality detection unit EDT has become possible by receiving the generation completion notification ED via an e-mail or the like.

For example, in the semiconductor device manufacturing system, a management device can transmit the identification information DI containing a recipe ID to the manufacturing device or the like using the SECS. The recipe ID is an ID for identifying a manufacturing condition of the manufacturing device. The recipe ID is used to identify detailed process condition such as, for example, a type of a gas used, a flow rate of the gas, a processing time, or the like. The identification information DI includes, in addition to the recipe ID, a plurality of condition parameters such as information about the semiconductor device (product) to be processed, information about the manufacturing device, and the like.

For example, the detection target identification unit TGR specifies the detection algorithm AL by appropriately combining a plurality of condition parameters in the identification information DI by a predetermined method, and transmits the selection information SI. In this case, the detection target identification unit TGR issues the generation request GR basically when a value of any one of the plurality of condition parameters included in the predetermined combination changes. However, the combination is not limited to an AND condition of the plurality of condition parameters but other conditions such as an OR condition and a DON'T CARE condition may be used, and the generation request GR may not always be issued even when any of the values changes. The detection algorithm AL and the recipe ID generally correspond one-to-one, but a single detection algorithm AL may correspond to a plurality of recipe IDs depending on the condition setting.

In FIG. 1, the signal input unit IIF is implemented by a dedicated circuit, by program processing performed by a CPU (Central Processing Unit), or by a combination thereof. The target signal selection unit SS, the abnormality detection unit EDT, the detection target identification unit TGR, and the algorithm generation unit ALG are implemented mainly by program processing performed by the CPU. Each of the detection target signal buffer SBF and the detection algorithm buffer ABF is configured by a RAM (Random Access Memory). The algorithm storage unit ADB is configured by a storage device such as a non-volatile memory and an HDD (Hard Disk Drive). It should be noted, however, that the implementation of each unit is not limited to the examples described above but may be any one of hardware, software, and a combination of hardware and software.

Moreover, the abnormality detection system (abnormality detection device) can be configured by, for example, a single component (for example, a wiring board) having a microcomputer including a CPU mounted thereon. Namely, it is possible to mount each unit shown in FIG. 1 on a single microcomputer, or isolate the algorithm storage unit ADB and mount it on an external component (for example, a flash memory) of the microcomputer. Furthermore, the abnormality detection system may be provided to the manufacturing device on a one-to-one basis or only one abnormality detection system may be provided to a plurality of manufacturing devices. In a case of providing it on the one-to-one basis, for example, the abnormality detection system may be incorporated in the manufacturing device, or installed as an external component of the manufacturing device.

[Detailed Operation of Each Unit]

Figure 2:
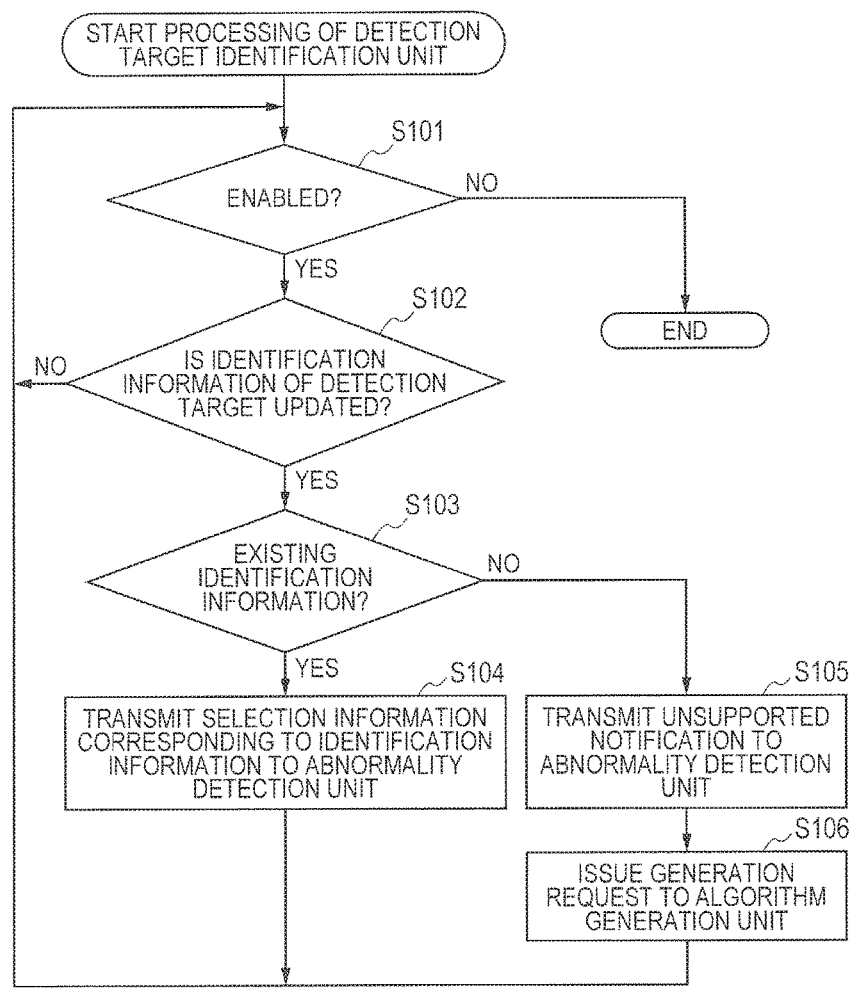
FIG. 2 is a flowchart showing an example of processing details of a detection target identification unit shown in FIG. 1.

FIG. 2 is a flowchart showing an example of processing details of the detection target identification unit shown in FIG. 1. In FIG. 2, the detection target identification unit TGR repeats the following processing as long as it is in an enabled state (Step S101). The detection target identification unit TGR firstly continues to wait for an update of the identification information DI of the detection target (Step S102). The manufacturing device performs processing of sequentially input semiconductor devices (semiconductor wafers) based on the currently set identification information DI unless the identification information DI is updated by the management device. As a result, the detection target section is generated in the monitor signal MS every time each semiconductor wafer is processed. The target signal selection unit SS extracts the monitor signal MS of the detection target section as the detection target signal TS and transmits the extracted detection target signal TS every time each semiconductor wafer is processed.

If the identification information DI is updated at Step S102, the detection target identification unit TGR determines whether the detection algorithm AL corresponding to the identification information DI is already stored in the algorithm storage unit ADB (Step S103). If it is already stored in the algorithm storage unit ADB, the detection target identification unit TGR transmits the selection information SI corresponding to the updated identification information DI to the abnormality detection unit EDT (Step S104). On the other hand, if it is not stored in the algorithm storage unit ADB, the detection target identification unit TGR transmits the unsupported notification NN to the abnormality detection unit EDT (Step S105), and issues the generation request GR to the algorithm generation unit ALG (Step S106).

Figure 3:
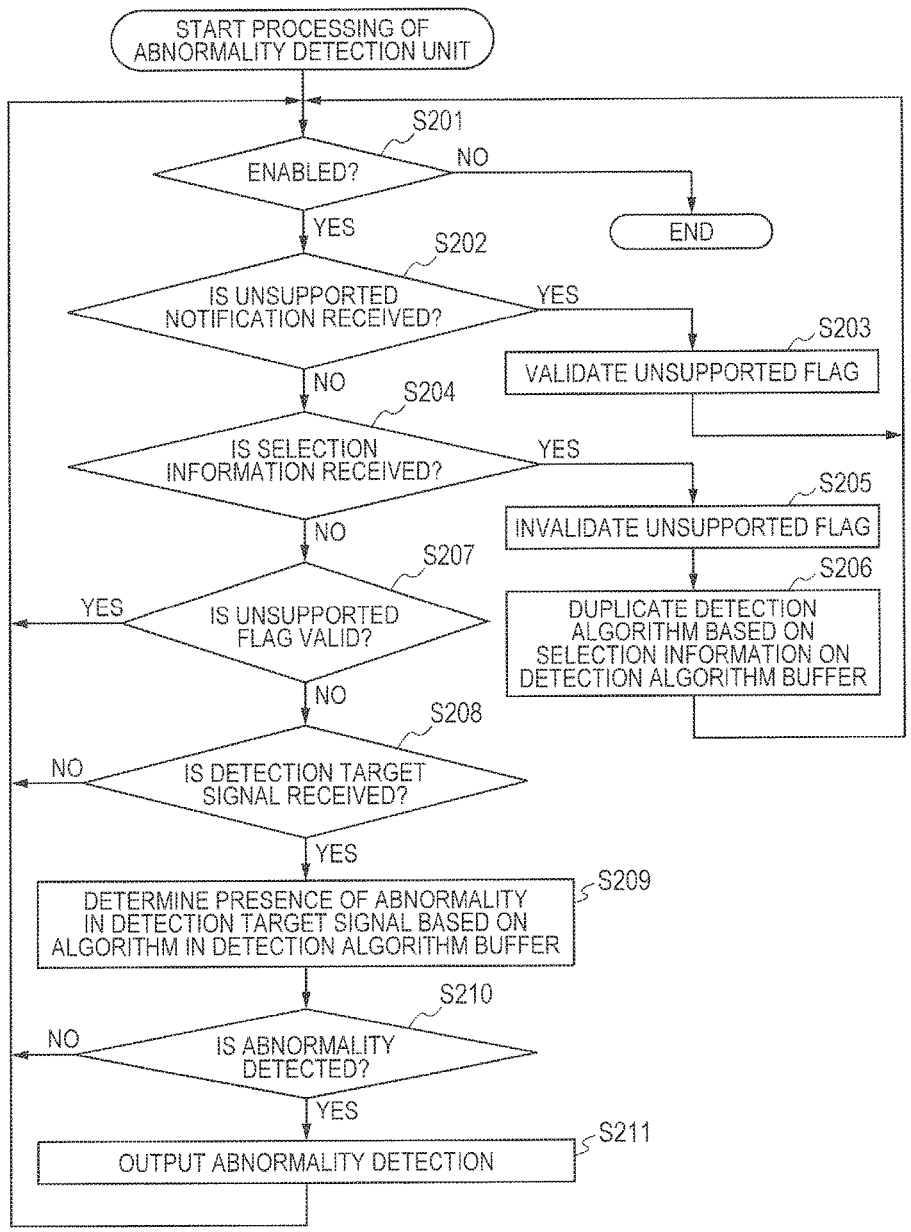
FIG. 3 is a flowchart showing an example of processing details of an abnormality detection unit shown in FIG. 1.

FIG. 3 is a flowchart showing an example of processing details of the abnormality detection unit shown in FIG. 1. In FIG. 3, the abnormality detection unit EDT repeats the following processing as long as it is in an enabled state (Step S201). If the abnormality detection unit EDT receives the unsupported notification NN from the detection target identification unit TGR (Step S202), the abnormality detection unit EDT firstly validates an unsupported flag and returns to Step S201 (Step S203). On the other hand, if the abnormality detection unit EDT receives the selection information SI from the detection target identification unit TGR (Step S204), the abnormality detection unit EDT invalidates the unsupported flag (Step S205), duplicates the detection algorithm AL specified by the selection information SI from the algorithm storage unit AIDE on the detection algorithm buffer ABF, and then returns to Step S201 (Step S206).

Subsequently, the abnormality detection unit EDT returns to Step S201 if the unsupported flag is valid, or proceeds to Step S208 if it is invalid (Step S207). At Step S208, the abnormality detection unit EDT waits for receiving the detection target signal TS from the target signal selection unit SS while dealing with the update of the unsupported notification NN (Step S202) and the selection information SI (Step S204). If the abnormality detection unit EDT receives the detection target signal TS, it determines the presence of an abnormality in the detection target signal TS based on the detection algorithm AL in the detection algorithm buffer ABF (Step S209). If the abnormality detection unit EDT detects an abnormality at Step S209 (Step S210), it transmits the output signal OUT containing the abnormality detection result (Step S211).

Figure 4:
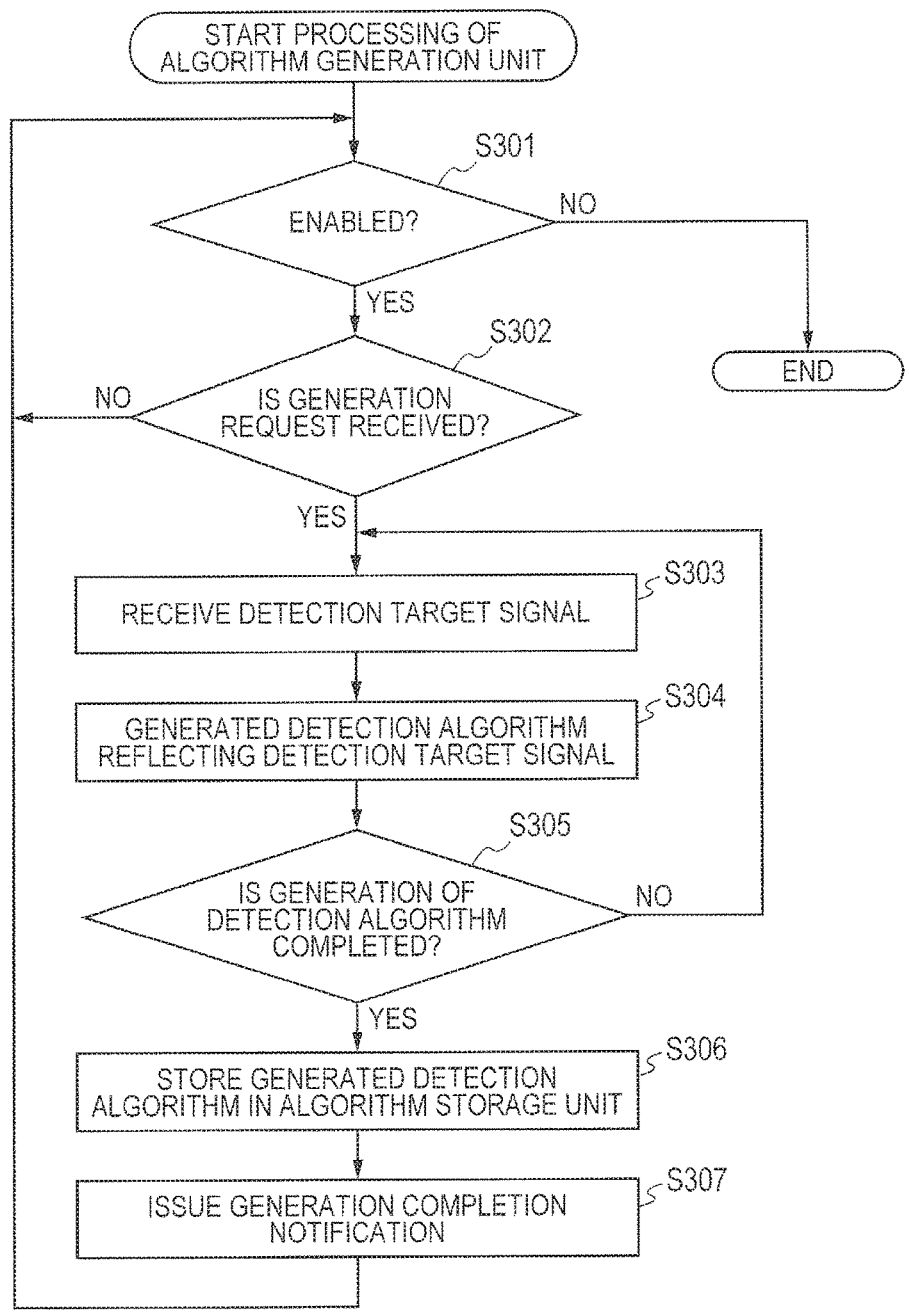
FIG. 4 is a flowchart showing an example of processing details of an algorithm generation unit shown in FIG. 1.
Figure 5:
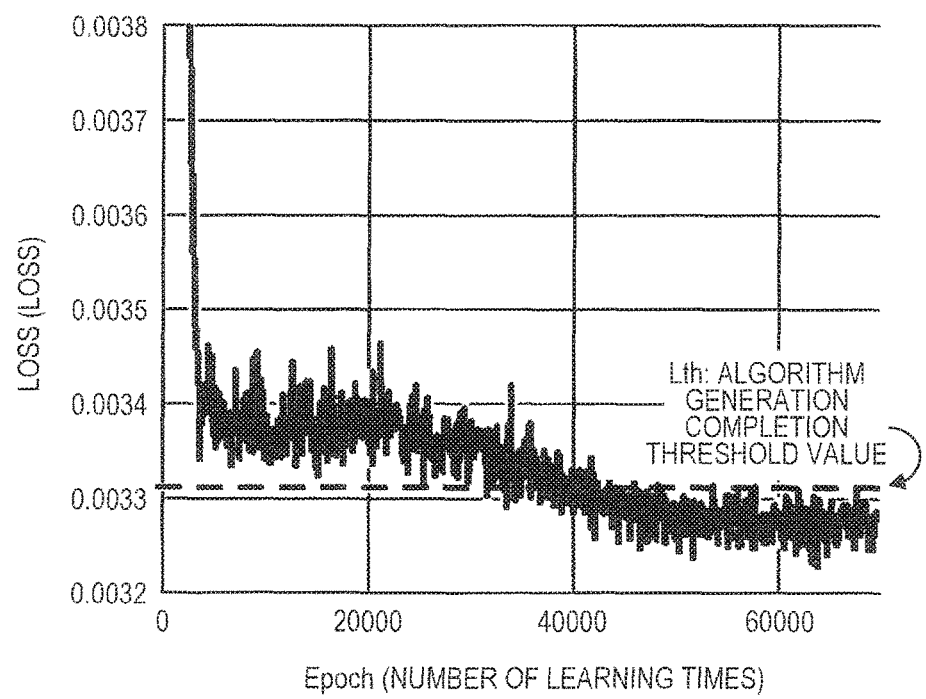
FIG. 5 is a supplementary diagram of FIG. 5.

FIG. 4 is a flowchart showing an example of processing details of the algorithm generation unit shown in FIG. 1. FIG. 5 is a supplementary diagram of FIG. 5. In FIG. 4, the algorithm generation unit ALG repeats the following processing as long as it is in an enabled state (Step S301). The algorithm generation unit ALG firstly continues to wait for the generation request GR from the detection target identification unit TGR (Step S302). If the algorithm generation unit ALG receives the generation request GR, the algorithm generation unit ALG receives the detection target signal TS from the target signal selection unit SS (Step S303), and generates the detection algorithm AL reflecting the detection target signal TS (Step S304). Steps S303 and S304 are repeated until generation of the detection algorithm AL is completed (Step S305).

For example, when performing the abnormality detection based on deep learning that is a type of AI, a network structure, a weight, a bias value, and the like of the neural network are generated as the detection algorithm AL. Deep learning includes repetition of learning processing of, while sequentially inputting the detection target signals TS to the neural network, calculating a difference between a value estimated by the neural network and an expected value as a loss value, and feeding back the loss value to the weight and the bias so as to make the loss value smaller. It is thus possible to determine whether generation of the detection algorithm AL is completed based on the convergence of the loss value.

For example, FIG. 5 shows an example of a relation between the number of learning times and the loss value, in which a threshold value Lth for determining whether generation of the detection algorithm AL is completed is provided with respect to the loss value. When the loss value is no higher than the threshold value Lth, the algorithm generation unit ALG determines that generation of the detection algorithm AL is completed. It should be noted that, when using the detection algorithm AL based on the statistical approach, the algorithm generation unit ALG may determine whether generation of the detection algorithm AL is completed by, for example, determining whether the number of receiving times of the detection target signal TS (i.e., parameter) has reached a predetermined number.

When generation of the detection algorithm AL is completed, the algorithm generation unit ALG stores the generated detection algorithm AL in the algorithm storage unit ADB (Step S306). At this time, the detection algorithm AL is stored in the algorithm storage unit ADB as being linked to the identification information DI included in the generation request GR, for example. Moreover, the algorithm generation unit ALG issues the generation completion notification ED (Step S307).

[Main Effects of First Embodiment]

Figure 12:
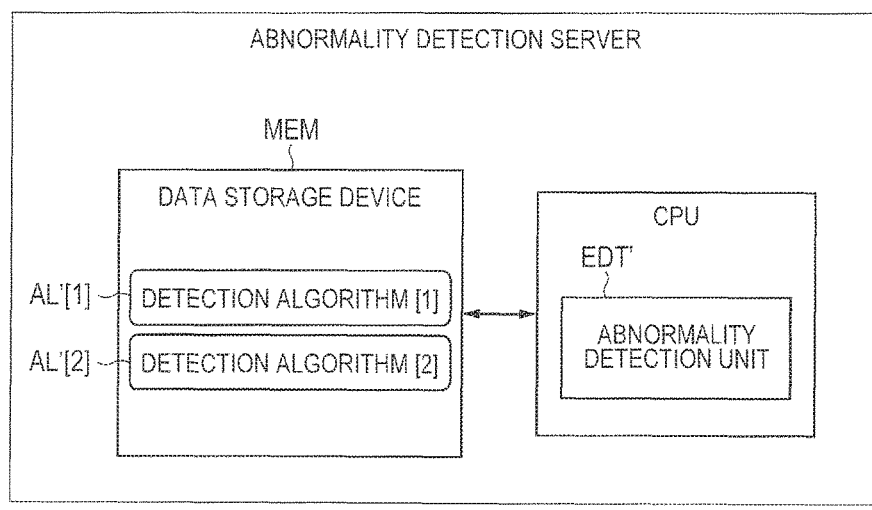
FIG. 12 is a schematic diagram showing an exemplary configuration of the main part of the abnormality detection system according to a comparison example of the present invention.

FIG. 12 is a schematic diagram showing an exemplary configuration of the main part of the abnormality detection system according to a comparison example of the present invention. As shown in FIG. 12, in the abnormality detection system according to the comparison example, abnormality detection is performed using an abnormality detection server arranged in the manufacturing system. That is, each monitor signal from a plurality of manufacturing devices in the manufacturing system is aggregated to the abnormality detection server via a communication network, where abnormality detection is performed. The abnormality detection server includes a data storage device MEM that stores therein a plurality of detection algorithms AL' [1], AL' [2] and a CPU. The CPU includes an abnormality detection unit EDT' implemented by program processing. The abnormality detection unit EDT' detects an abnormality in the monitor signal while appropriately selecting any one of the plurality of detection algorithms AL' [1], AL' [2].

A case is now assumed in which the abnormality detection system according to the comparison example is used and a new detection target (for example, a combination of the manufacturing device and a product) emerges. In this case, an engineer sequentially inputs prototype semiconductor devices (semiconductor wafers) to the manufacturing device of the detection target, and simultaneously downloads the monitor signals during the input period to, for example, his own PC (Personal Computer). The engineer may generate a new detection algorithm to detect an abnormality in the monitor signal and registers it in the data storage device MEM using the PC.

In this case, however, the workload of the engineer may be heavier. Moreover, inputting such a prototype semiconductor device usually requires a procedure different from a batch processing procedure for a mass production line for inputting a mass production semiconductor device, and thus may cause a situation in which the manufacturing device of the detection target is isolated from the mass production line (in other words, exclusive use of the manufacturing device) for a certain period. This may possibly reduce the manufacturing efficiency.

Furthermore, for example, when the detection algorithms AL' [1], AL' [2] are AI-based detection algorithms, as can be seen from FIG. 5, it is difficult for the engineer to explicitly recognize how many prototype semiconductor devices (semiconductor wafers) should be input to generate the detection algorithm. As a result, generation of the detection algorithm is performed on a trial-and-error basis, which may lead to cost increase due to excessive input of the prototype semiconductor devices and time loss as a result of repeating the input on a trial-and-error basis.

On the other hand, using the abnormality detection system shown in FIG. 1, when a new detection target emerges, for example, the detection algorithm AL is automatically generated by the algorithm generation unit ALG by inputting the prototype semiconductor device to the manufacturing device of the detection target, and the detection algorithm AL is automatically stored in the algorithm storage unit ADB. This makes it possible to reduce the workload of the engineer. Moreover, the abnormality detection system shown in FIG. 1 is configured so that the prototype semiconductor device and the mass production semiconductor device for which the detection algorithm AL has already been generated can be input without distinguishing one from the other. For example, the abnormality detection unit EDT can switch whether to execute abnormality detection or not depending on the selection information SI and the unsupported notification NN. As a result, as shown in FIG. 12, the exclusive use of the manufacturing device is not caused and thus reduction of the manufacturing efficiency can be suppressed.

Furthermore, because the abnormality detection system shown in FIG. 1 issues the generation completion notification ED when generation of the detection algorithm AL is completed, when generating the detection algorithm, it may continue to input the prototype semiconductor devices by mixing them into the mass production semiconductor devices, for example, until the generation completion notification ED is issued. If the generation completion notification ED is issued, it is possible to manually stop the input of the prototype semiconductor device and to stop the input of the prototype semiconductor device by an automatic processing using the management device. This also makes it possible to reduce the above-mentioned cost loss and time loss.

It should be noted that the abnormality detection system shown in FIG. 1 can be linked one-to-one to the manufacturing device as the abnormality detection device. In such a case, abnormality detection can be performed quicker than a case in which the signals are aggregated to the abnormality detection server as shown in FIG. 12.

Second Embodiment

[Configuration of Abnormality Detection System (Application Example)]

Figure 6:
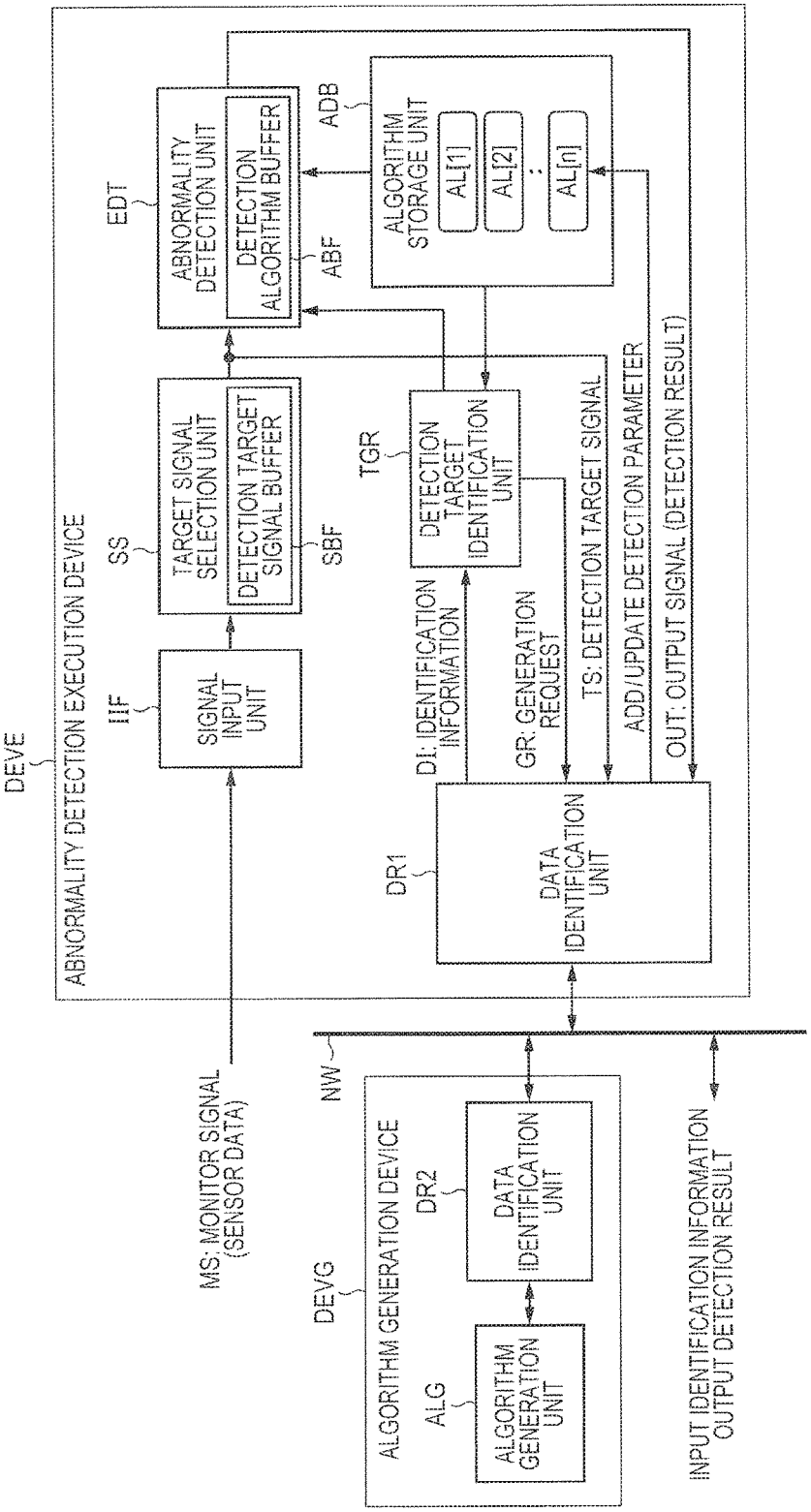
FIG. 6 is a schematic diagram showing an exemplary configuration of the main part of the abnormality detection system according to a second embodiment of the present invention.

FIG. 6 is a schematic diagram showing an exemplary configuration of the main part of the abnormality detection system according to a second embodiment of the present invention. The abnormality detection system (abnormality detection device) shown in FIG. 6 includes an abnormality detection execution device DEVE, an algorithm generation device DEVG, and a communication network NW that couples them. The abnormality detection execution device DEVE is configured by, for example, a single device including a microcomputer (for example, a wiring board), and the algorithm generation device DEVG is configured by another device. The algorithm generation device DEVG may be, for example, a computer system such as a PC.

The abnormality detection execution device DEVE includes those components in the exemplary configuration shown in FIG. 1 except the algorithm generation unit ALG, and additionally includes a data identification unit DR1. On the other hand, the algorithm generation device DEVG includes the algorithm generation unit ALG among the exemplary configuration shown in FIG. 1, and additionally includes a data identification unit DR2. Each of the data identification units DR1, DR2 takes a role of an interface of the communication network NW and communicates with each other via the communication network NW. The communication network NW may be, for example, an Ethernet (registered trademark) network.

The data identification unit DR1 receives the identification information DI from the communication network NW and transmits it to the detection target identification unit TGR. Moreover, the data identification unit DR1 transmits the generation request GR, the detection target signal TS, and the output signal OUT from the detection target identification unit TGR, the target signal selection unit SS, and the abnormality detection unit EDT to the communication network NW. Furthermore, the data identification unit DR1 receives the detection algorithm (detection parameter) AL from the communication network NW (algorithm generation device DEVG) and stores it in the algorithm storage unit ADB.

The data identification unit DR2 receives the generation request GR and the detection target signal TS from the communication network NW (abnormality detection execution device DEVE) and transmits them to the algorithm generation unit ALG. The data identification unit DR2 also transmits the detection algorithm (detection parameter) AL generated by the algorithm generation unit ALG and the generation completion notification ED to the abnormality detection execution device DEVE or the like via the communication network NW. It should be noted that there may be provided a plurality of algorithm generation units ALG, which may generate different detection algorithms AL in parallel.

[Structure of Communication Format]

Figures 7, 8:
FIG. 7 is a diagram showing an exemplary structure of a main part of a packet communicated by a data identification unit in the abnormality detection system shown in FIG. 6.
FIG. 8 is a supplementary diagram of FIG. 7.

FIG. 7 is a diagram showing an exemplary structure of a main part of a packet communicated by the data identification unit in the abnormality detection system shown in FIG. 6, and FIG. 8 is a supplementary diagram of FIG. 7. As shown in FIG. 7, each packet communicated by the data identification units DR1, DR2 contains three elements of a packet type TYP, a size SZ, and a payload PLD. The packet type TYP stores therein any one of the numbers shown in FIG. 8. The detection target signal TS, the output signal (detection result) OUT, the identification information DI of the detection target, the generation request GR of the detection algorithm, and the detection algorithm (detection parameter) AL are distinguished from one another by this number. The size SZ stores therein the data size of the payload PLD. For example, in a case where the data size of the payload PTD is 8 bytes, a value '8' is stored in the size SZ. The payload PLD stores therein the data corresponding to the packet type TYP.

Figure 9:
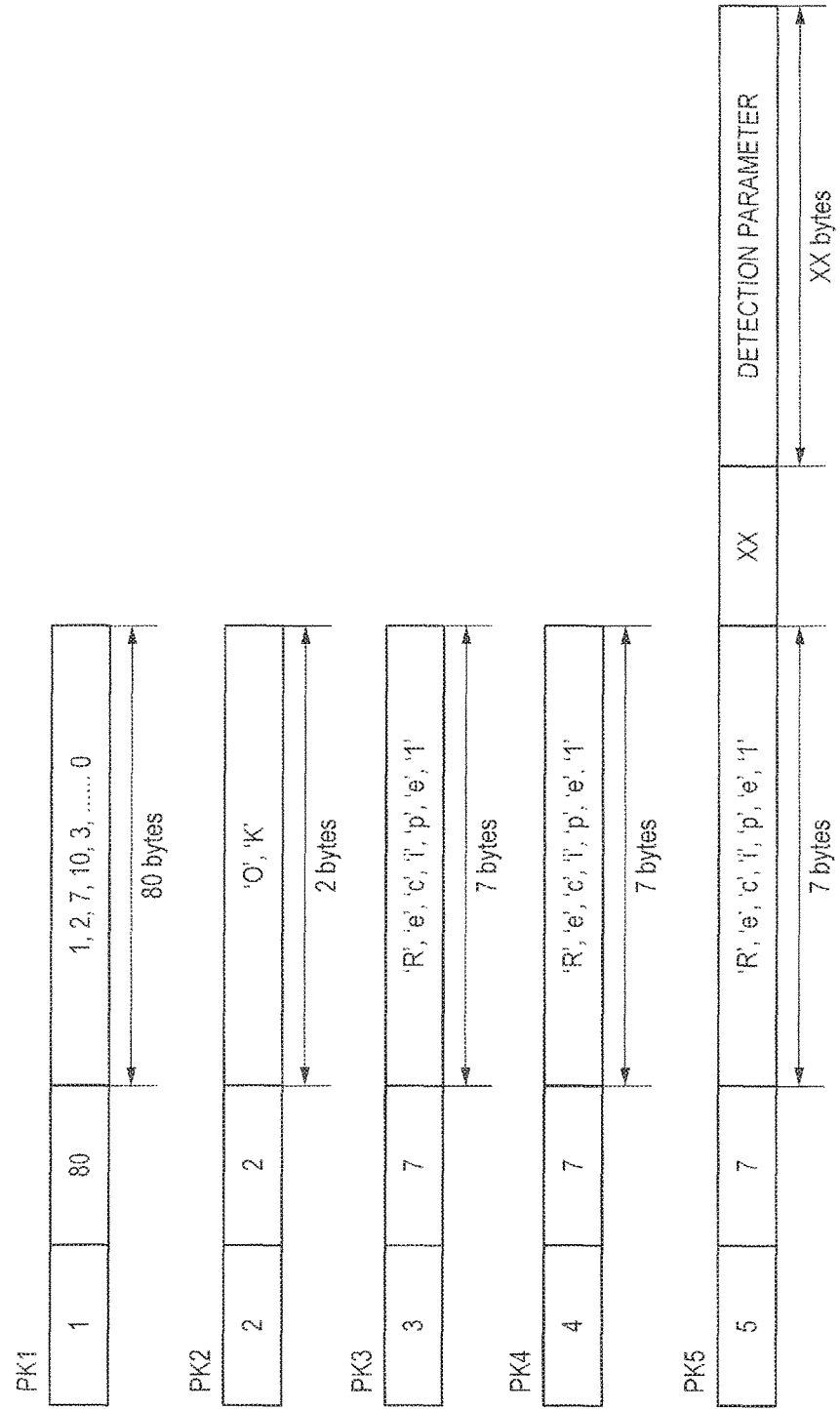
FIG. 9 is a diagram showing a specific example of the packet based on FIGS. 7 and 8.

FIG. 9 is a diagram showing a specific example of the packet based on FIGS. 7 and 8. To transmit the detection target signal TS to the communication network NW, the data identification unit DR1 generates and transmits a packet PK1. The packet PK1 stores '1' in the packet type TYP, '80' in the size SZ, and an 80-byte data of "1, 2, 7, 10, . . . " to be the detection target signal TS in the payload PLD. The data identification unit DR2 receives the packet PK1, and transmits the data of the payload PLD to the algorithm generation unit ALG.

To transmit the output signal (detection result) OUT to the communication network NW, the data identification unit DR1 generates and transmits a packet PK2. The packet PK2 stores '2' in the packet type TYP, '2' in the size SZ, and a character code of "OK" indicating that no abnormality is detected in the payload PLD. The packet PK2 may be received by, for example, a SCADA (Supervisory Control And Data Acquisition) (not shown) that monitors the system.

The data identification unit DR1 receives a packet PK3 containing the identification information DI generated by, for example, a MES (Manufacturing Execution System) (not shown) that manages a production process via the communication network NW. The packet PK3 stores '3' in the packet type TYP, '7' in the size SZ, and a character code of "Recipe1" as the identification information DI in the payload PLD. As described with reference to FIG. 1, the identification information DI may also include various condition parameters, but it is assumed herein that the identification information DI is the recipe ID for convenience of explanation. The data identification unit DR1 transmits the data of the payload PLD to the detection target identification unit TGR.

To transmit the generation request GR to the communication network NW, the data identification unit DR1 generates and transmits a packet PK4. The packet PK4 stores '4' in the packet type TYP, '7' in the size SZ, and a character code of "Recipe1" as the identification information DI corresponding to the generation request GR in the payload PLD. The data identification unit DR2 receives the packet PK4, and issues the generation request GR linked to the identification information DI to the algorithm generation unit ALG. It should be noted that, in a case where a plurality of algorithm generation units ALG are provided, the data identification unit DR2 can have different algorithm generation units ALG generate detection algorithms in parallel when it receives the packets PK4 containing different identification information DI within a predetermined period.

To transmit the detection algorithm (detection parameter) AL generated by the algorithm generation unit ALG to the communication network NW, the data identification unit DR2 generates and transmits a packet PK5. The packet PK5 contains two pairs of the size SZ and the payload PLD. The packet type TYP stores therein '5'. The size SZ of the first pair stores therein '7' and the payload PLD of the first pair stores therein the character code of "Recipe1" as the identification information DI corresponding to the generated detection algorithm AL.

The size SZ of the second pair stores therein 'XX' and the payload PLD of the second pair stores therein the detection parameter of the generated detection algorithm AL (for example, the network structure of the neural network, the weight, or the bias value). The data identification unit DR1 receives the packet PK5, links the detection algorithm (detection parameter) AL to the identification information DI, and registers it in the algorithm storage unit ADB. In the packet PKS, for example, a packet in which the size SZ and the payload PLD in the second pair are deleted can be used as the generation completion notification ED shown in FIG. 1.

[Main Effect of Second Embodiment]

It is possible to obtain the same effect as the first embodiment by using the abnormality detection system according to the second embodiment. Furthermore, in the second embodiment, a configuration suitable for an actual practice is obtained by separating the abnormality detection execution device DEVE and the algorithm generation device DEVG to implement the abnormality detection system shown in FIG. 1. For example, a PC having a high computing capability can be used as the algorithm generation device DEVG assuming deep learning and the like, and a microcomputer having a small size and low power consumption can be used as the abnormality detection execution device DEVE.

Thus, by combining the low power consumption abnormality detection execution device DEVE that operates constantly in association with abnormality detection and the algorithm generation device DEVG that operates only when an unknown detection target emerges, the power consumption of the whole system can be reduced. Moreover, it is possible to reduce time required to calculate a detection parameter when the unknown detection target emerges. Furthermore, by configuring the abnormality detection execution device DEVE using a small microcomputer instead of a large one like a PC, possibility of installing the abnormality detection execution device DEVE in a limited installation space can be increased. It should be noted that the communication format is not limited to such a format as shown in FIGS. 7 and 8 but a similar function can be achieved using the SECS.

Third Embodiment

[Configuration of Semiconductor Device Manufacturing System]

Figure 10:
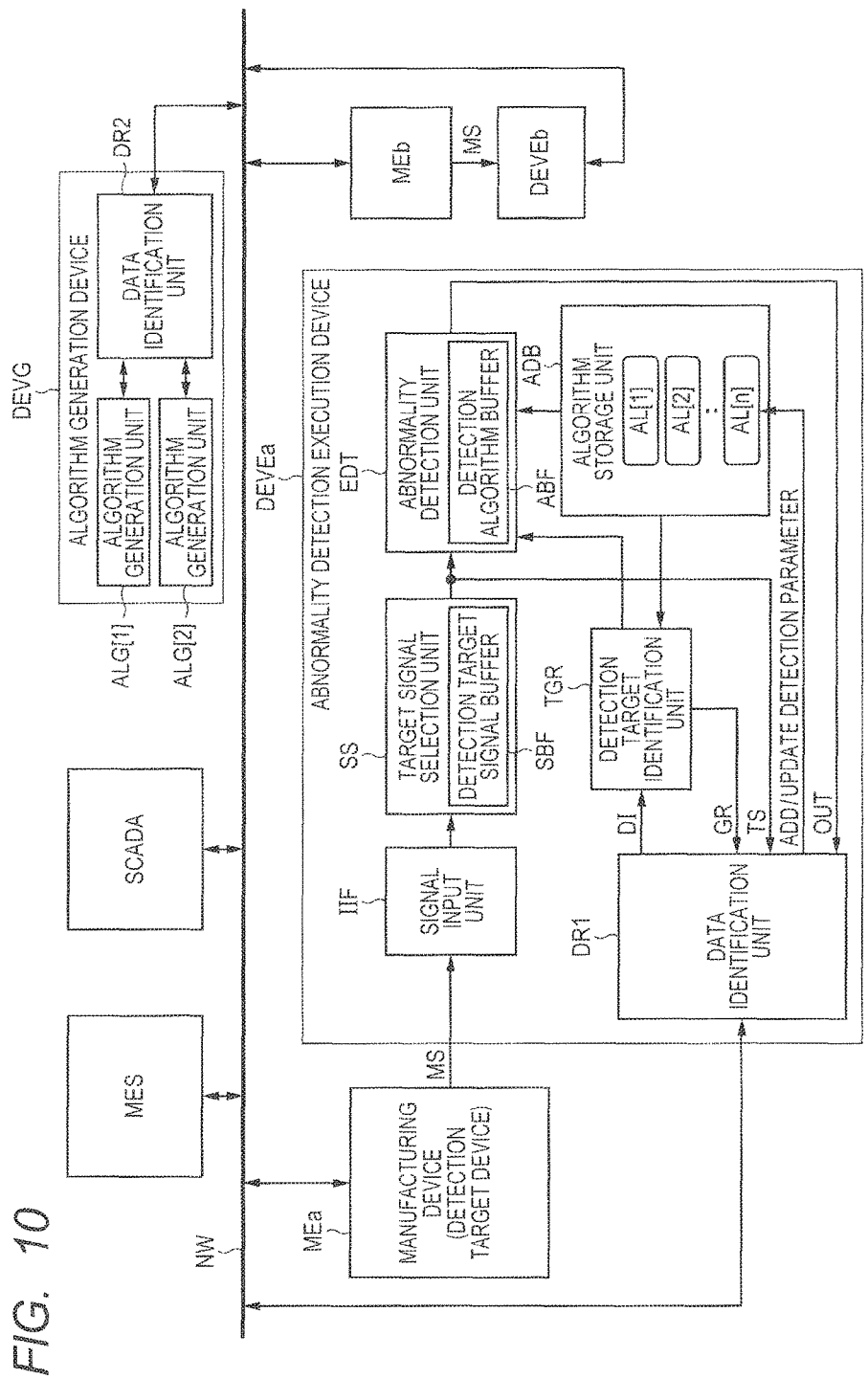
FIG. 10 is a schematic diagram showing an exemplary configuration of the main part of a semiconductor device manufacturing system according to a third embodiment of the present invention.

FIG. 10 is a schematic diagram showing an exemplary configuration of the main part of a semiconductor device manufacturing system according to a third embodiment of the present invention. The manufacturing system shown in FIG. 10 includes a plurality of abnormality detection execution devices DEVEa, DEVEb, a plurality of manufacturing devices (detection target devices) MEa, MEb, the algorithm generation device DEVG, the MES (Manufacturing Execution System), the SCADA (Supervisory Control And Data Acquisition), and the communication network NW that couples them.

Each of the abnormality detection execution devices DEVEa, DEVEb includes the same configuration as and performs the same operation as the abnormality detection execution device DEVE shown in FIG. 6. The algorithm generation device DEVG also includes the same configuration as and performs the same operation as shown in FIG. 6. It should be noted, however, that algorithm generation device DEVG includes a plurality of (two in this embodiment) algorithm generation units ALG[1] ALG[2] as described with reference to the second embodiment.

The SCADA is a monitoring device for the whole manufacturing system. The MES is a management device for the production process, which transmits the identification information DI including the recipe ID indicative of the manufacturing condition of the manufacturing devices MEa, MEb to the communication network NW when inputting the semiconductor device (semiconductor wafer) to the manufacturing devices MEa, MEb. Each of the manufacturing devices MEa, MEb processes the semiconductor wafer under the manufacturing condition based on the recipe ID from the MES, and outputs the monitor signal MS indicative of the processing state. The manufacturing devices MEa, MEb herein output the monitor signal MS to the abnormality detection execution devices DEVEa, DEVEb, respectively. Examples of the manufacturing devices MEa, MEb include, for example, a plasma CVD (Chemical Vapor Deposition) device that performs a processing treatment associated with a film forming process, an exposure device that performs a processing treatment associated with a patterning process, and a plasma etching device that performs a processing treatment associated with an etching process.

[Semiconductor Device Manufacturing Method]

FIG. 11A is a timing chart schematically showing an example of a semiconductor device manufacturing method using the manufacturing system shown in FIG. 10, and FIG. 11B is a timing chart that follows FIG. 11A. At Step S401 in FIG. 11A, the MES transmits a packet PK31 to the communication network NW. The packet PK31 notifies the manufacturing device MEa and the abnormality detection execution device DEVEa of the identification information DI of "Recipe1". Here, although the identification information DI actually includes a plurality of condition parameters, it is assumed herein as the recipe ID for convenience of explanation as in the second embodiment. In the abnormality detection execution device DEVEa of this example, the detection algorithm AL corresponding to "Recipe1" is already stored in the algorithm storage unit ADD. In this case, the packet PK31 means an order of commencement using a mass production semiconductor wafer.

The manufacturing device MEa processes the sequentially input mass production semiconductor wafers using "Recipe1", and outputs the monitor signal MS during the processing. The abnormality detection execution device DEVEa sequentially extracts detection target signals TS1, TS2 from the monitor signal MS every time each of the sequentially input semiconductor wafers is processed. The abnormality detection execution device DEVEa detects an abnormality of the manufacturing device MEa by determining the presence of the abnormality in the detection target signals TS1, TS2 based on the detection algorithm AL corresponding to "Recipe1". As a result, the abnormality detection execution device DEVEa transmits a packet PK21 indicative of the detection result of "OK" to the SCADA when it determines that the detection target signal TS1 is normal, and transmits a packet PK22 indicative of the detection result of "NG" to the SCADA when it determines that the detection target signal TS2 is abnormal.

At Step S402, the MES then transmits a packet PK32 to the communication network NW. The packet PK32 notifies the manufacturing device MEa and the abnormality detection execution device DEVEa of the identification information DI of "Recipe2". In the abnormality detection execution device DEVEa of this example, the detection algorithm AL corresponding to "Recipe2" is not stored in the algorithm storage unit ADB. In this case, the packet PK32 means the order of commencement using a prototype semiconductor wafer.

The abnormality detection execution device DEVEa receives the identification information DI of "Recipe2" and transmits a packet PK41 indicative of the generation request GR of the detection algorithm AL corresponding to "Recipe2" to the algorithm generation device DEVG. Accordingly, the algorithm generation device DEVG starts generation of the detection algorithm AL corresponding to "Recipe2" and waits for a detection target signal required for generation.

The manufacturing device MEa processes the input prototype semiconductor wafer using "Recipe2" and outputs the monitor signal MS during the processing. The abnormality detection execution device DEVEa extracts a detection target signal TS3 from the monitor signal MS. The abnormality detection execution device DEVEa does not detect an abnormality in the detection target signal TS3 but transmits a packet PK11 containing the detection target signal TS3 to the algorithm generation device DEVG. The algorithm generation device DEVG generates the detection algorithm AL reflecting the detection target signal TS3. It is assumed here that the detection algorithm AL has been generated using the detection target signal TS3 alone.

When the detection algorithm AL corresponding to "Recipe2" is generated, the algorithm generation device DEVG transmits a packet PK51 to the MES, for example. The packet PK51 uses the packet PK5 as the generation completion notification ED, as described with reference to FIG. 9. The MES recognizes that the mass production semiconductor wafer corresponding to "Recipe2" can be now input by receiving the packet PK51. Moreover, the algorithm generation device DEVG transmits a packet PK52 containing "Recipe2" and the detection algorithm (detection parameter) to the abnormality detection execution device DEVEa. The abnormality detection execution device DEVEa stores the detection algorithm AL corresponding to "Recipe2" in the algorithm storage unit ADB according to the packet PK52.

At Step S403 in FIG. 11B, the MES transmits a packet PK33 to the communication network NW. The packet PK33 notifies the manufacturing device MEa and the abnormality detection execution device DEVEa of the identification info nation DI of "Recipe3". In the abnormality detection execution device DEVEa of this example, the detection algorithm AL corresponding to "Recipe3" is not stored in the algorithm storage unit ADB as in the case of Step S402. In this case, as in Step S402, the packet PK33 means the order of commencement using a prototype semiconductor wafer.

The abnormality detection execution device DEVEa transmits a packet PK42 indicative of the generation request GR of the detection algorithm AL corresponding to "Recipe3" to the algorithm generation device DEVG. The algorithm generation device DEVG starts generation of the detection algorithm AL corresponding to "Recipe3" according to the packet PK42, and waits for the detection target signal required for generation. At this time, if the algorithm generation unit ALG [1] in the algorithm generation device DEVG is ever generating the detection algorithm AL associated with Step S402 described above, the algorithm generation unit ALG [2] starts generation of the detection algorithm AL corresponding to "Recipe3".

The manufacturing device MEa processes the input prototype semiconductor wafer using "Recipe3", and the abnormality detection execution device DEVEa extracts a detection target signal TS4 from the monitor signal MS associated with the processing. The abnormality detection execution device DEVEa does not detect an abnormality in the detection target signal TS4 but transmits a packet PK12 containing the detection target signal TS4 to the algorithm generation device DEVG. The algorithm generation device DEVG generates the detection algorithm AL reflecting the detection target signal TS4. In this example, generation of the detection algorithm AL is not completed, and the algorithm generation device DEVG continues to wait for the detection target signal associated with "Recipe3".

At Step S404, the MES transmits a packet PK34 to the communication network NW. The packet PK34 notifies the manufacturing device MEa and the abnormality detection execution device DEVEa of the identification information DI of "Recipe2". In the abnormality detection execution device DEVEa, the detection algorithm AL corresponding to "Recipe2" is stored in the algorithm storage unit ADB in association with Step S402 described above. Thus, the packet PK34 means the order of commencement using a mass production semiconductor wafer.

The manufacturing device MEa processes the input mass production semiconductor wafer using "Recipe2", and the abnormality detection execution device DEVEa extracts a detection target signal TS5 from the monitor signal MS associated with the processing. The abnormality detection execution device DEVEa detects an abnormality of the manufacturing device MEa by determining the presence of an abnormality in the detection target signal TS5 based on the detection algorithm AL corresponding to "Recipe2". As a result, the abnormality detection execution device DEVEa transmits a packet PK23 indicative of the detection result of "OK" to the SCADA when it determines that the detection target signal TS5 is normal.

Subsequently at Step S405, the same processing as in Step S401 is performed. In other words, a packet PK35 performs the same processing on "Recipe1" as in the case of the packet PK31, and a packet PK24 similar to the packet PK21 described above is transmitted as the detection result. Although not shown, when a packet similar to the packet PK33 at Step S403 is transmitted later, the algorithm generation device DEVG resumes generation of the detection algorithm AL corresponding to "Recipe3" based on the subsequent detection target signal.

[Main Effect of Third Embodiment]

The same effects as those described in the first and second embodiments can be obtained using the abnormality detection system according to the third embodiment. Especially as illustrated in FIGS. 11A and 11B, it is possible to generate the detection algorithm AL as in Steps S402, S403 between Step S401 and Step S405 (i.e. between batch processings for the mass production line), for example, without isolating the manufacturing device MEa from the mass production line. Moreover, as illustrated in Steps S402, S404, it is possible to quickly start mass production using the detection algorithm AL as its generation is completed. This makes it possible to improve the manufacturing efficiency.

Furthermore, as shown in FIG. 10, providing the manufacturing devices MEa, MEb and the abnormality detection execution devices DEVEa, DEVEb on a one-to-one basis makes it possible to detect an abnormality promptly. In other words, as shown in FIG. 12, by not aggregating the monitor signals MS from the manufacturing devices MEa, MEb to the abnormality detection server coupled to the communication network NW but performing abnormality detection separately on each one of the manufacturing devices MEa, MEb, a processing load and a communication load (i.e. resource) are dispersed, and consequently it is made possible to detect an abnormality promptly. It should be noted that the abnormality detection execution devices DEVEa, DEVEb are, as described above, configured by, for example, a small wiring board, which can be incorporated in the manufacturing devices MEa, MEb or installed as external components of the manufacturing devices MEa, MEb.

Although the invention made by the inventors has been specifically described above with reference to the embodiments, the invention is not limited to the embodiments, but various modifications can be made without departing from the scope of the invention. For example, the embodiments are made to describe the invention in detail for better understanding but not limited to include all the configurations described above. It is possible to replace a part of a configuration of one embodiment with a configuration of another embodiment or to add a configuration of one embodiment to a configuration of another. It is also possible to add, delete, or replace a part of the configuration of each embodiment.

What is claimed is:

1. An abnormality detection system to which identification information of a detection target and a detection target signal obtained from a monitor signal of the detection target are input and that detects an abnormality of the detection target signal, comprising:
    an algorithm storage unit that stores therein a detection algorithm corresponding to the identification information;
    an abnormality detection unit that detects the abnormality in the detection target signal using the detection algorithm corresponding to the identification information stored in the algorithm storage unit;
    a detection target identification unit that determines whether the detection algorithm corresponding to the identification information is stored in the algorithm storage unit and issues a generation request when the detection algorithm is not stored therein, and
    an algorithm generation unit that generates the detection algorithm corresponding to the identification information using the detection target signal according to the generation request.

2. The abnormality detection system according to claim 1, wherein the algorithm generation unit issues a generation completion notification when generation of the detection algorithm is completed.

3. The abnormality detection system according to claim 1, wherein the algorithm generation unit stores the generated detection algorithm in the algorithm storage unit when generation of the detection algorithm is completed.

4. The abnormality detection system according to claim 1, wherein the detection target identification unit transmits selection information identifying the detection algorithm corresponding to the identification information to the abnormality detection unit when the detection algorithm corresponding to the identification information is stored in the algorithm storage unit, and transmits an unsupported notification to the abnormality detection unit when the detection algorithm is not stored therein, and
    wherein the abnormality detection unit does not detect the abnormality in the detection target signal when receiving the unsupported notification.

5. The abnormality detection system according to claim 1, wherein the abnormality detection unit and the detection target identification unit are mounted on a microcomputer.

6. The abnormality detection system according to claim 1, wherein the detection algorithm is an AI (Artificial Intelligence) based algorithm.

7. The abnormality detection system according to claim 6, wherein the algorithm storage unit, the abnormality detection unit, and the detection target identification unit are mounted on a first device comprising a microcomputer,
    wherein the algorithm generation unit is mounted on a second device different from the first device, and
    wherein the first device and the second device are coupled via a communication network.

8. A semiconductor device manufacturing system comprising a manufacturing device, an abnormality detection device, and a management device coupled via a communication network,
    wherein the management device transmits identification information containing a recipe ID indictive of a manufacturing condition of the manufacturing device to the communication network,
    wherein the manufacturing device processes a semiconductor device under the manufacturing condition based on the recipe ID from the management device and outputs a monitor signal indicative of a state of the processing, and
    wherein the abnormality detection device comprises:
    a target signal selection unit that specifies a detection target signal to be detected from among the monitor signals;
    an algorithm storage unit that stores therein a detection algorithm corresponding to the identification information;
    an abnormality detection unit that detects an abnormality in the detection target signal using the detection algorithm corresponding to the identification information stored in the algorithm storage unit;
    a detection target identification unit that determines whether the detection algorithm corresponding to the identification information is stored in the algorithm storage unit, and issues a generation request when the detection algorithm is not stored therein, and
    an algorithm generation unit that generates the detection algorithm corresponding to the identification information using the detection target signal according to the generation request and stores the generated detection algorithm in the algorithm storage unit.

9. The semiconductor device manufacturing system according to claim 8,
    wherein the algorithm generation unit issues a generation completion notification when generation of the detection algorithm is completed.

10. The semiconductor device manufacturing system according to claim 8,
    wherein the algorithm generation unit stores the generated detection algorithm in the algorithm storage unit when generation of the detection algorithm is completed.

11. The semiconductor device manufacturing system according to claim 8, wherein the detection target identification unit transmits selection information identifying the detection algorithm corresponding to the identification information to the abnormality detection unit when the detection algorithm is stored in the algorithm storage unit, and transmits an unsupported notification to the abnormality detection unit when the detection algorithm is not stored therein, and wherein the abnormality detection unit does not detect the abnormality in the detection target signal when receiving the unsupported notification.

12. The semiconductor device manufacturing system according to claim 8, wherein the detection algorithm is an AI (Artificial Intelligence) based algorithm.

13. The semiconductor device manufacturing system according to claim 12, wherein the algorithm storage unit, the abnormality detection unit, and the detection target identification unit are mounted on a first device comprising the microcomputer, and wherein the algorithm generation unit is mounted on a second device coupled to the first device via the communication network.

14. The semiconductor device manufacturing system according to claim 13, wherein the semiconductor device manufacturing system comprises a plurality of manufacturing devices, and wherein the first device is provided to each one of the plurality of manufacturing devices.

15. A semiconductor device manufacturing method using a manufacturing device, an abnormality detection device, and a management device coupled via a communication network, wherein the management device transmits identification information containing a recipe ID indictive of a manufacturing condition of the manufacturing device to the communication network, wherein the manufacturing device processes a semiconductor device under the manufacturing condition based on the recipe ID from the management device and outputs a monitor signal indicative of a state of the processing, wherein the abnormality detection device comprises:

a target signal selection unit that specifies a detection target signal to be detected from among the monitor signals;

an algorithm storage unit that stores therein a detection algorithm corresponding to the identification information;

an abnormality detection unit that detects an abnormality in the detection target signal using the detection algorithm corresponding to the identification information stored in the algorithm storage unit;

a detection target identification unit that determines whether the detection algorithm corresponding to the identification information is stored in the algorithm storage unit and issues a generation request when the detection algorithm is not stored there; and an algorithm generation unit that generates the detection algorithm corresponding to the identification information using the detection target signal according to the generation request, issues a generation completion notification when generation of the detection algorithm is completed, and stores the generated detection algorithm in the algorithm storage unit, and wherein the manufacturing method comprises:

a first step at which the manufacturing device processes the mass production semiconductor device using a first recipe ID;

a second step at which the abnormality detection device detects the mass production semiconductor device associated with the first step;

a third step at which the manufacturing device processes the mass production semiconductor device using a second recipe ID;

a fourth step at which the abnormality detection device issues the generation request in response to the identification information containing the second recipe ID and generates the detection algorithm corresponding to the identification information according to the generation request;

a fifth step at which the abnormality detection device issues the generation completion notification associated with the fourth step and then the manufacturing device processes the mass production semiconductor device using the second recipe ID, and a sixth step at which the abnormality detection device detects an abnormality of the manufacturing device associated with the fifth step.

16. The semiconductor device manufacturing method according to claim 15, wherein the detection target identification unit transmits selection information identifying the detection algorithm corresponding to the identification information to the abnormality detection unit when the detection algorithm is stored in the algorithm storage unit, and transmits an unsupported notification to the abnormality detection unit when the detection algorithm is not stored therein, and wherein the abnormality detection unit does not detect the abnormality in the detection target signal when receiving the unsupported notification.

17. The semiconductor device manufacturing method according to claim 15, further comprising:

a seventh step at which the manufacturing device processes the mass production semiconductor device using a recipe ID different from the second recipe ID between the fourth step and the fifth step.

18. The semiconductor device manufacturing method according to claim 15, wherein the detection algorithm is an AI (Artificial Intelligence) based algorithm.

* * * * *